United States Patent
Schmidt et al.

(10) Patent No.: US 10,153,833 B2
(45) Date of Patent: *Dec. 11, 2018

(54) METHODS AND APPARATUS FOR SELF HEALING OF AN OPTICAL TRANSCEIVER IN A WAVELENGTH DIVISION MULTIPLEXING (WDM) SYSTEM

(71) Applicant: Juniper Networks, Inc., Sunnyvale, CA (US)

(72) Inventors: Theodore J. Schmidt, Gilroy, CA (US); Roberto Marcoccia, San Jose, CA (US); George R. Sosnowski, Sunnyvale, CA (US); Christian Malouin, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/869,812

(22) Filed: Jan. 12, 2018

(65) Prior Publication Data

US 2018/0138970 A1   May 17, 2018

Related U.S. Application Data

(63) Continuation of application No. 14/871,424, filed on Sep. 30, 2015, now Pat. No. 9,882,633.

(51) Int. Cl.
| | |
|---|---|
| *H04B 10/03* | (2013.01) |
| *H04B 10/40* | (2013.01) |
| *H04J 14/02* | (2006.01) |

(52) U.S. Cl.
CPC ............ *H04B 10/03* (2013.01); *H04B 10/40* (2013.01); *H04J 14/0295* (2013.01); *H04J 14/0297* (2013.01)

(58) Field of Classification Search
USPC ..... 370/360, 380, 389, 535; 385/16; 398/48, 398/42, 43, 75, 79, 95
See application file for complete search history.

(56) References Cited

U.S. PATENT DOCUMENTS

| | | | |
|---|---|---|---|
| 5,777,761 | A | 7/1998 | Fee |
| 6,101,012 | A | 8/2000 | Danagher et al. |
| (Continued) | | | |

FOREIGN PATENT DOCUMENTS

| | | |
|---|---|---|
| CN | 1617012 A | 5/2005 |
| CN | 101651495 A | 2/2010 |
| (Continued) | | |

OTHER PUBLICATIONS

Office Action for Chinese Application No. 201610282756.9, dated Jan. 29, 2018, 10 pages.

(Continued)

*Primary Examiner* — David Payne
*Assistant Examiner* — Omar S Ismail
(74) *Attorney, Agent, or Firm* — Cooley LLP

(57) ABSTRACT

In some embodiments, an apparatus includes an optical transceiver that includes a first set of electrical transmitters operatively coupled to a switch. Each electrical transmitter from the first set of electrical transmitters is configured to transmit an electrical signal from a set of electrical signals. In such embodiments, the switch is configured to switch an electrical signal from the set of electrical signals such that the set of electrical signals are transmitted via a second set of electrical transmitters. Each electrical transmitter from the second set of electrical transmitters is operatively coupled to an optical transmitter from a set of optical transmitters. The set of optical transmitters is operatively coupled to an optical multiplexer. In such embodiments, at least one electrical transmitter from the second set of elec- (Continued)

trical transmitters is associated with a failure within the optical transceiver.

20 Claims, 9 Drawing Sheets

(56) References Cited

U.S. PATENT DOCUMENTS

| | | | |
|---|---|---|---|
| 6,172,782 | B1 | 1/2001 | Kobayashi |
| 6,839,366 | B1 | 1/2005 | Houle |
| 7,233,717 | B2 | 6/2007 | Ono et al. |
| 7,426,346 | B2 | 9/2008 | Wang |
| 7,941,053 | B2 | 5/2011 | Dallesasse |
| 8,041,210 | B2 | 10/2011 | Aronson et al. |
| 8,693,864 | B2 | 4/2014 | Kubo et al. |
| 9,118,411 | B1 | 8/2015 | Schmidt et al. |
| 9,350,445 | B1 | 5/2016 | Schmidt et al. |
| 9,882,633 | B2 | 1/2018 | Schmidt et al. |
| 2005/0100346 | A1 | 5/2005 | Kim et al. |
| 2005/0168806 | A1 | 8/2005 | Maeda et al. |
| 2008/0095541 | A1* | 4/2008 | Dallesasse ............ H04B 10/40 398/191 |
| 2009/0116839 | A1 | 5/2009 | Kikuchi et al. |
| 2010/0021166 | A1 | 1/2010 | Way |
| 2010/0158530 | A1 | 6/2010 | Soto et al. |
| 2010/0183294 | A1* | 7/2010 | Villarruel ............ H04B 10/032 398/10 |
| 2011/0249936 | A1 | 10/2011 | Welch et al. |
| 2012/0082168 | A1* | 4/2012 | Sunaga ................ G02B 6/4246 370/401 |
| 2012/0082458 | A1* | 4/2012 | Bouda .................... H04J 14/02 398/69 |
| 2012/0170938 | A1 | 7/2012 | Evans et al. |
| 2013/0209105 | A1 | 8/2013 | Jeong et al. |
| 2014/0029951 | A1 | 1/2014 | Handelman |
| 2014/0079385 | A1 | 3/2014 | Shukunami et al. |
| 2015/0050015 | A1* | 2/2015 | Levy .................. H04Q 11/0005 398/2 |
| 2017/0093516 | A1 | 3/2017 | Marcoccia et al. |

FOREIGN PATENT DOCUMENTS

| | | |
|---|---|---|
| EP | 2437418 A2 | 4/2012 |
| EP | 2661004 A2 | 11/2013 |
| WO | WO 2006/065573 | 6/2006 |

OTHER PUBLICATIONS

Extended European Search Report for European Patent Application No. 16163429.0, dated Feb. 23, 2017, 8 pages.
Extended European Search Report for European Patent Application No. 16163428.2, dated Mar. 2, 2017, 7 pages.
Office Action for U.S. Appl. No. 14/042,068, dated Dec. 10, 2014, 13 pages.
Office Action for U.S. Appl. No. 14/834,168, dated Aug. 24, 2015.
Office Action for U.S. Appl. No. 14/871,514, dated Nov. 10, 2016, 16 pages.

* cited by examiner

800

802 — Detects, at a first optical transceiver, a failure associated with an optical receiver within the first optical transceiver.

804 — Embeds, at a first optical transceiver, a control signal associated with the failure with an optical signal transmitted from the first optical transceiver to a second optical transceiver.

806 — Receives, at a second optical transceiver, the control signal.

808 — Activates, at a second optical transceiver, a spare optical transmitter to match active optical receivers within the first optical transceiver.

810 — Receives, at a first optical transceiver, the expected signal from the second optical transceiver.

FIG. 8

METHODS AND APPARATUS FOR SELF HEALING OF AN OPTICAL TRANSCEIVER IN A WAVELENGTH DIVISION MULTIPLEXING (WDM) SYSTEM

CROSS-REFERENCE TO RELATED APPLICATIONS

This application is a continuation of U.S. patent application Ser. No. 14/871,424, now U.S. Pat. No. 9,882,633, filed on Sep. 30, 2015, and entitled "Methods and Apparatus for Self Healing of an Optical Transceiver in a Wavelength Division Multiplexing (WDM) System."

This application is related to U.S. patent application Ser. No. 14/042,068, now U.S. Pat. No. 9,118,411, filed on Sep. 30, 2013, and entitled "Method and Apparatus for Detection and Correction of Channel Failure in an Optical Transceiver System."

This application is related to U.S. patent application Ser. No. 14/834,168, now U.S. Pat. No. 9,350,445, filed on Aug. 24, 2015, and entitled "Method and Apparatus for Detection and Correction of Channel Failure in an Optical Transceiver System," which is a continuation of the aforementioned U.S. patent application Ser. No. 14/042,068.

This application is related to U.S. patent application Ser. No. 14/871,514, now U.S. Pat. No. 10,020,908, filed on Sep. 30, 2015, and entitled "Method and Apparatus for Remote Management of an Optical Transceiver System."

The aforementioned applications are incorporated herein by reference in their entirety.

BACKGROUND

Some embodiments described herein relate generally to methods and apparatus for self healing of an optical transceiver containing multiple wavelength division multiplexing (WDM) channels. In particular, but not by way of limitation, some embodiments described herein relate to methods and apparatus for detection and correction of channel failure in an optical transceiver used in WDM systems.

Optical transceivers used in WDM systems transmit and receive data by combining a number of different optical channels or signals at different wavelengths onto a single optical fiber or a set of optical fibers. Each wavelength can be associated with a different WDM channel. Light for these WDM channels can be modulated to produce optical signals at different wavelengths to carry data separately. To achieve a sufficiently high data throughput rate, the number of optical WDM channels in optical transceivers can be increased.

A challenge for such optical transceivers with a high number of channels is channel reliability because the probability of a channel failure within such optical transceivers increases with the number of channels for each optical transceiver. Channel failure disrupts the WDM system because the optical transceiver having the failed channel cannot transmit or receive data while the failed channel is out of service or being repaired. In some instances, the entire optical transceiver may need to be replaced. The increased probability of channel failure is particularly problematic with board-mounted optical transceivers, where replacement of board-mounted optical transceivers typically involves factory rework.

Accordingly, a need exists for methods and apparatus for an optical receiver that self heals upon a channel failure in a WDM system.

SUMMARY

In some embodiments, an apparatus includes an optical transceiver that includes a first set of electrical transmitters operatively coupled to a switch. Each electrical transmitter from the first set of electrical transmitters is configured to transmit an electrical signal from a set of electrical signals. In such embodiments, the switch is configured to switch an electrical signal from the set of electrical signals such that the set of electrical signals are transmitted via a second set of electrical transmitters. Each electrical transmitter from the second set of electrical transmitters is operatively coupled to an optical transmitter from a set of optical transmitters. The set of optical transmitters is operatively coupled to an optical multiplexer. In such embodiments, at least one electrical transmitter from the second set of electrical transmitters is associated with a failure within the optical transceiver.

In some embodiments, an apparatus includes an optical transceiver that includes a first set of electrical receivers operatively coupled to a switch. Each electrical receiver from the first set of electrical receivers is configured to receive an electrical signal from a set of electrical signals. In such embodiments, the switch is configured to switch an electrical signal from the set of electrical signals such that the set of electrical signals are output via a second set of electrical receivers. Each electrical receiver from the first set of electrical receivers is operatively coupled to an optical receiver from a set of optical receivers. The set of optical receivers is operatively coupled to an optical demultiplexer. The optical demultiplexer receives a set of optical signals via a common fiber. In such embodiments, at least one electrical receiver from the first set of electrical receivers is associated with a failure within the optical transceiver.

BRIEF DESCRIPTION OF THE DRAWINGS

FIG. 8 is a flow chart illustrating a method of self healing an optical transceiver upon a detection of a failure at a receiver of the optical transceiver, according to an embodiment.

DETAILED DESCRIPTION

In some embodiments, an apparatus includes an optical transceiver that includes a first set of electrical transmitters operatively coupled to a switch. Each electrical transmitter from the first set of electrical transmitters is configured to transmit an electrical signal from a set of electrical signals. In such embodiments, the switch is configured to switch an electrical signal from the set of electrical signals such that the set of electrical signals are transmitted via a second set of electrical transmitters. Each electrical transmitter from the second set of electrical transmitters is operatively coupled to an optical transmitter from a set of optical transmitters. The set of optical transmitters is operatively coupled to an optical multiplexer. In such embodiments, at least one electrical transmitter from the second set of electrical transmitters is associated with a failure within the optical transceiver.

In some embodiments, an apparatus includes an optical transceiver that includes a first set of electrical receivers operatively coupled to a switch. Each electrical receiver from the first set of electrical receivers is configured to receive an electrical signal from a set of electrical signals. In such embodiments, the switch is configured to switch an electrical signal from the set of electrical signals such that the set of electrical signals are output via a second set of electrical receivers. Each electrical receiver from the first set of electrical receivers is operatively coupled to an optical receiver from a set of optical receivers. The set of optical receivers is operatively coupled to an optical demultiplexer. The optical demultiplexer receives a set of optical signals via a common fiber. In such embodiments, at least one electrical receiver from the first set of electrical receivers is associated with a failure within the optical transceiver.

As used in this specification, the singular forms "a," "an" and "the" include plural referents unless the context clearly dictates otherwise. Thus, for example, the term "an optical transceiver" is intended to mean a single optical transceiver or multiple optical transceivers.

Figure 1:
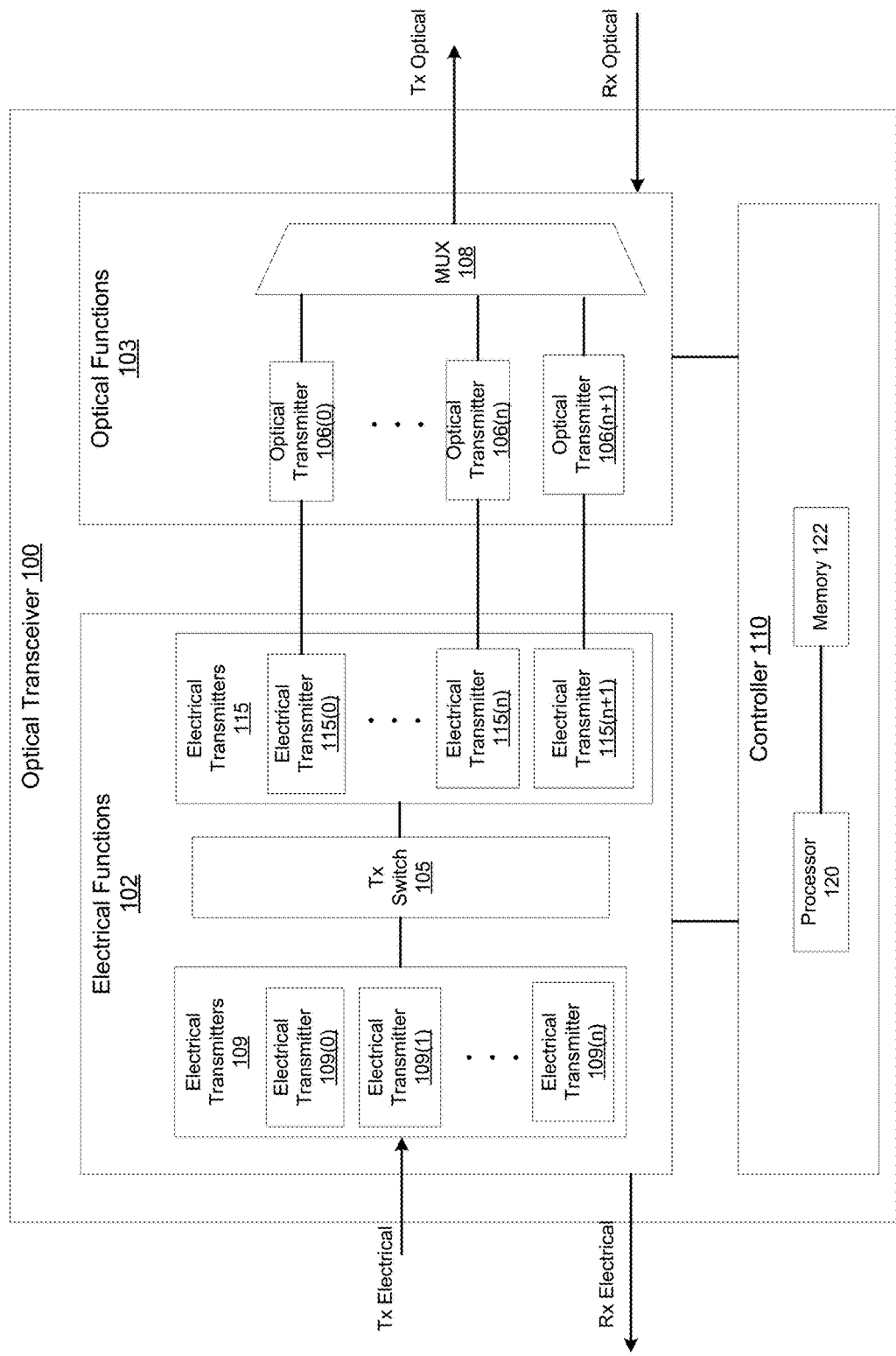
FIG. 1 is a block diagram of an optical transceiver, according to an embodiment.

FIG. 1 is a block diagram of an optical transceiver, according to an embodiment. The optical transceiver 100 can be any high data rate optical transceiver such as, for example, an on-off-keyed (OOK) transmitter, an optical M-ary quadrature amplitude modulation (M-QAM) transmitter, an optical M-ary pulse amplitude modulation (mPAM) transmitter, a polarization multiplexed (PM) M-QAM transmitter, and/or the like. The optical transceiver 100 includes electrical functions 102, optical functions 103, and/or a controller 110. The electrical functions 102 are operatively coupled to the optical functions 103. The electrical functions 102 and the optical functions 103 are operatively coupled to the controller 110. Each of the electrical functions 102, the optical functions 103, and the controller 110 can send signals to and/or receive signals from each other. Although the electrical functions 102, the optical functions 103, and the controller 110 are shown separately in FIG. 1, each need not be physically separate from the other two. Stated differently, the electrical functions 102 and/or the optical functions 103 and/or the controller 110 may be co-located and/or integrated together within a single module, subsystem or component.

The electrical functions 102 generate and/or process electrical signals sent to and/or received from the optical functions 103. The electrical functions 102 can also send to and/or receive electric signals from the controller 110. The electrical functions 102 can be, for example, circuitry such as hardware (e.g., analog components) or firmware (e.g., Application-Specific Integrated Circuit). The electrical functions 102 can send and/or receive channel signals to and/or from the optical functions 103 to be transmitted and/or received optically.

The electrical functions 102 include the electronic components of the optical transceiver 100. For example, the electrical functions 102 may include a first set of electrical transmitters 109(0)-109(n), a transmit (Tx) switch 105, and a second set of electrical transmitters 115(0)-115(n+1) to transmit a set of electrical signals to the optical functions 103. The electrical functions 102 may also include a first set of electrical receivers, a receive (Rx) switch and a second set of electrical receivers (not shown in FIG. 1, but described in greater detail in FIG. 2) to receive a set of electrical signals from the optical functions 103.

The first set of electrical transmitters 109(0)-109(n) may include, for example, N channels that receive a set of electrical signals and output to the Tx switch 105. Each electrical transmitter from the first set of electrical transmitters 109(0)-109(n) can transmit a channel of an electrical signal from the set of electrical signals. The transmit (Tx) switch 105 can include, for example, a clock and data recovery (CDR) array, a set of demultiplexers, a pseudorandom binary sequence (PRBS) generator, a multiplexer, a modulator driver array and a laser driver array (not shown in FIG. 3). The receive (Rx) switch (not shown in FIG. 1, but similar to 175 in FIG. 2) can include, for example, a transimpedance amplifier/limiting amplifier (TIA/LA) array, a demultiplexer, a pseudorandom binary sequence (PRBS) analyzer, a set of multiplexers and a serializer array (not shown in FIG. 1). In an event of detection of a failure within the optical transceiver 100, the Tx switch 105 can be configured to switch one or multiple electrical signals from the received set of electric signals from the first set of electrical transmitters 109(0)-109(n) such that the set of electric signals are transmitted via a second electrical transmitter 115(0)-115(n+1).

The optical functions 103 include the photonic components of the optical transceiver 100. For example, the optical functions 103 may include a set of optical transmitters 106(0)-106(n+1), and an optical multiplexer 108 operatively coupled to the set of optical transmitters 106(0)-106(n+1). The optical functions 103 may also include a set of optical receivers, and an optical demultiplexer (not shown in FIG. 1, but described in greater detail in FIG. 2) operatively coupled to the set of optical receivers (not shown in FIG. 1, but described in greater detail in FIG. 2). As discussed in detail herein, the optical functions 103 can send optical signals to and/or receive electrical signals from the electrical functions 102. Additionally, the optical functions 103 can also send signals to and/or receive signals from the controller 110, and can send optical signals to a far-side optical transceiver (not shown in FIG. 1) and/or receive optical signals from a far-side optical transceiver (not shown in FIG. 1). The transmitted (Tx) optical signals includes a set of optical channels multiplexed by the optical multiplexer 108 onto a single optical fiber (or multiple optical fibers). When multiplexed onto multiple optical fibers, two or more optical signals can be multiplexed by the optical multiplexer 108 onto each of the multiple optical fibers.

Each optical transmitter 106(0)-106(n+1) from the set of optical transmitters in the optical functions 103 can transmit at a unique wavelength from a set of wavelengths. When an optical transmitter (e.g., 106(2), not shown in FIG. 1) from the set of optical transmitters 106(0)-106(n+1) fails, a spare optical transmitter (e.g., 106(n+1)) can transmit at a unique wavelength from the set of wavelengths. Similarly, each optical receiver from the set of optical receivers in the optical transceiver 100 can receive at a unique wavelength from a set of wavelengths. Hence, the optical transceiver 100 can continue transmitting and/or receiving optical signals upon failure of an individual optical transmitter (e.g., 106(2), not shown in FIG. 1) from the set of optical transmitters and/or an individual optical receiver from the set of optical receivers. The optical signals transmitted by the set of optical transmitters are received at the optical multiplexer 108. Given that each optical transmitter 106(0)-106(n+1) from the set of optical transmitters transmits at a unique wavelength, when an optical transmitter (e.g., 106 (2), not shown in FIG. 1) fails and the spare optical transmitter (e.g., 106(n+1)) is enabled, the set of optical receivers will stop receiving optical signals at the failed wavelength and start receiving optical signals at the spare wavelength. The Tx switch 105 activates a spare electrical transmitter (e.g., 115 (n+1)) to enable the connectivity from the Tx electrical signals to the Tx optical signals.

The optical multiplexer 108 is a hardware device that can, for example, multiplex and route different channels of light or optical signals into or out of, for example, a single mode fiber (SMF). The optical multiplexer 108 can multiplex the optical signals generated and/or transmitted by the different optical transmitters from the set of optical transmitters 106(0)-106(N+1) and send the different channels of optical signals to a single mode fiber. The different channels of optical signals can be sent to a remote optical transceiver (not shown in FIG. 1) via such single mode fiber.

Referring to the embodiment of the optical transceiver system 100 shown in FIG. 1, the controller 110 controls the detection and correction of channel failure in the optical transceiver 100. Although FIG. 1 shows the controller 110 to be separate from the electrical functions 102 and the optical functions 103, the controller 110 may be physically co-located with the electrical functions 102 and/or the optical functions 103. For example, in some configurations, the controller 110 may be physically disposed within an integrated circuit package co-packaged with the set of electrical transmitters, the set of electrical receivers, the Tx switch, the Rx switch, the set of optical transmitters, the set of optical receivers, the optical multiplexer and/or the optical demultiplexer.

In some embodiments, the controller 110 includes a processor 120 and a memory 122. The memory 122 can be, for example, a random-access memory (RAM) (e.g., a dynamic RAM, a static RAM), a flash memory, a removable memory, a hard drive, a database and/or so forth. In some implementations, the memory 122 can include, for example, a database, process, application, virtual machine, and/or some other software modules (stored and/or executing in hardware) or hardware modules configured to execute a detection and correction of channel failure process and/or one or more associated methods for the detection and correction of channel failure. In such embodiments, instructions for executing the detection and correction of the channel failure process and/or the associated methods can be stored within the memory 122 and executed at the processor 120.

The processor 120 can be configured to, for example, write data into and read data from the memory 122, and execute the instructions stored within the memory 122. The processor 120 can also be configured to execute and/or control, for example, the operations of the optical transmitters 106(0)-106(n), the Tx switch 105, the set of electrical transmitters 109 and 115, an variable optical attenuator (VOA) (such as the VOA 581 discussed in FIG. 5), and an optical detector (such as the MPD 583 in FIG. 5). In some implementations, based on the methods or processes stored within the memory 122, the processor 120 can be configured to execute a detection and correction of channel failure process, as described in FIG. 8.

In some instances, the controller 110 detects a failure within the optical transceiver 100. The failure can be located at the set of optical transmitters 106(0)-106(n), a set of optical receivers (not shown in FIG. 1), or anywhere between the Tx switch 105 and the set of optical transmitters 106(0)-106(n). The failure can be associated with one element within the optical transceiver 100, for example, one optical transmitter from the set of optical transmitters 106 (0)-106(n), or multiple elements within the optical transceiver 100, for example, multiple optical transmitters from the set of optical transmitters 106(0)-106(n). When multiple elements (e.g., multiple optical transmitters/receivers) within the optical transceiver fail, multiple spare elements (e.g., multiple spare optical transmitters/receivers, multiple spare electrical transmitters/receivers)) can be activated for transmitting/receiving optical/electrical signals.

In some configurations, a power monitor (not shown in FIG. 1) included in the controller 110 can monitor the power in the optical signals in the different channels. The power monitor can monitor the power level of the optical signals output from each optical transmitter 106(0)-106(n+1), output from the multiplexer 108, before the optical signals are received at the optical demultiplexer, or after the optical demultiplexer. In one implementation, data photodiodes operatively coupled to the optical demultiplexer can be used to monitor optical power level for a given channel in the receiver side of the optical transceiver. In such configurations, the power monitor can monitor the power of the optical signals at each unique wavelength from the set of wavelengths associated with the different channels. In such instances, the power monitor can detect a failure of an individual optical transmitter from the set of optical transmitters 106(0)-106(n+1) if, for example, the power in optical signals transmitted by the individual optical transmitter at a unique wavelength is below a pre-determined level.

In addition to monitoring the optical power of the optical signals output from each optical transmitter, other indicators can be used to detect failures. For example, a laser gain current approaching an end-of-life (EOL) value can indicate a failure. For another example, a modulator bias outside of operational limits can indicate a failure.

Upon detection of a failure associated with an optical transmitter at the optical transceiver 100, the Tx switch 105 can remap the associations between the first set of electrical transmitters 109(1)-109(n) and the second set of electrical transmitters 115(1)-115(n+1) such that the Tx electrical signals, which were transmitted via the failed channel(s), can now be transmitted via functional channel(s). For example, before a failure of an optical transmitter is detected, Tx electrical signals from the electrical transmitter 109(1) is transmitted to the electrical transmitter 115(1) and then to the optical transmitter 106(1). Tx electrical signals from the electrical transmitter 109(2) (not shown in FIG. 1) is transmitted to the electrical transmitter 115(2) and then to the optical transmitter 106(2). If the optical transmitter 106(2) from the set of optical transmitters 106(1)-106(n) fails, in some instances, the Tx switch 105 can switch the Tx electrical signals from the electrical transmitter 109(2) such that the Tx electrical signals from the electrical transmitter 109(2) can be transmitted to the electrical transmitter 115 (n+1) and then to the optical transmitter 106(n+1). In other instances, if the optical transmitter 106(2) from the set of optical transmitters 106(1)-106(n) fails, the Tx switch 105 can switch the Tx electrical signals from the electrical transmitters 109(2)-109(n) such that the Tx electrical signals from the electrical transmitter 109(2) can be transmitted to the electrical transmitter 115(3) and then to the optical transmitter 106(3), and that the Tx electrical signals from the electrical transmitter 109(3) can be transmitted to the electrical transmitter 115(4) and then to the optical transmitter 106(4), and that the Tx electrical signals from the electrical transmitter 109(n) can be transmitted to the electrical transmitter 115(n+1) and then to the optical transmitter 106(n+1).

When multiple optical transmitters from the set of optical transmitters 106(0)-106(n+1) fail, multiple spare optical transmitters can be activated. The Tx switch 105 can switch multiple channels of the electrical signals that were transmitted through electrical transmitters associated with the multiple failed optical transmitters to the spare electrical transmitters from the multiple spare optical transmitters.

Figure 2:
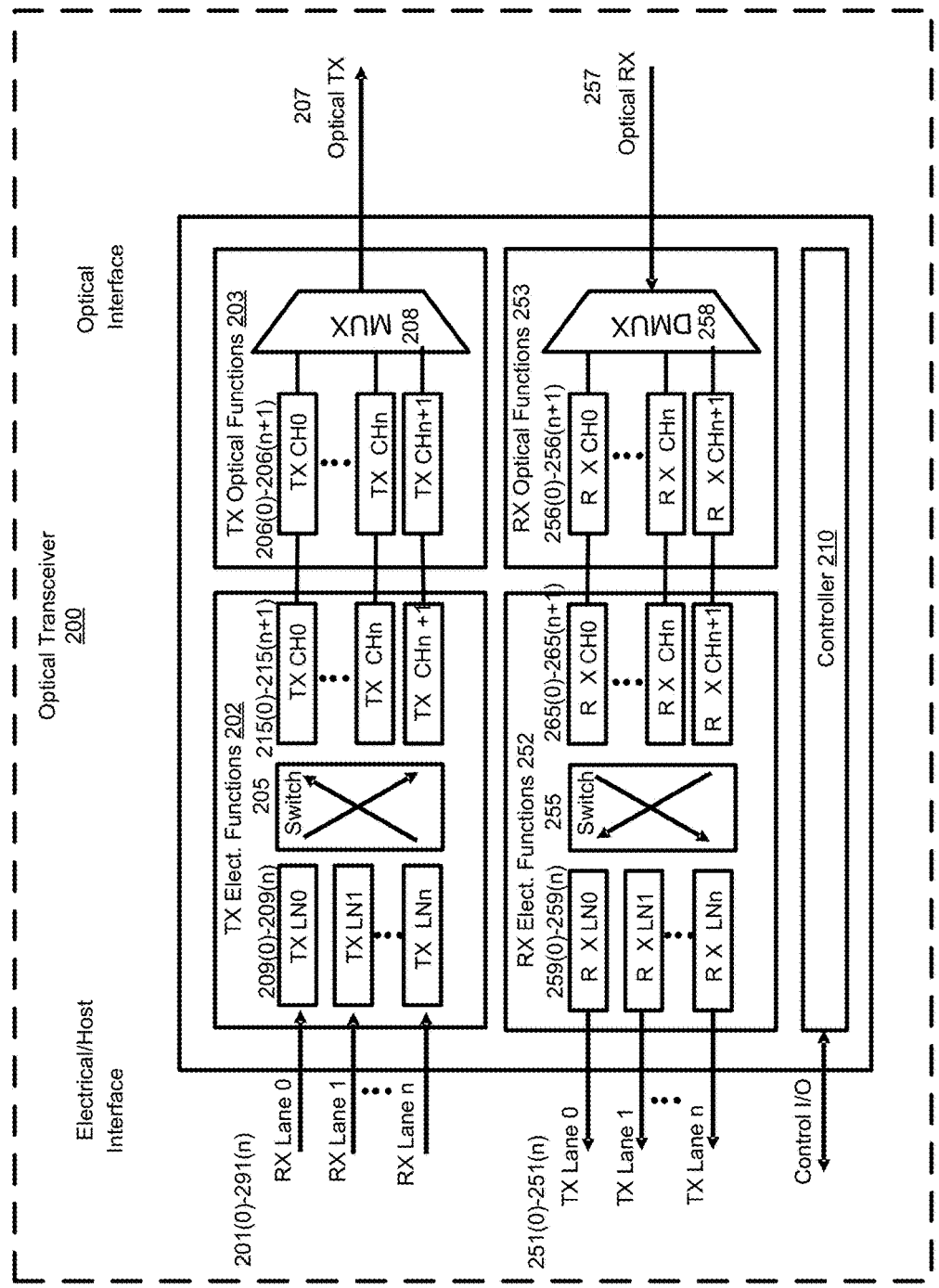
FIG. 2 is a block diagram illustrating an optical transceiver, according to an embodiment.

FIG. 2 is a block diagram illustrating an optical transceiver, according to an embodiment. The optical transceiver 200 (similar to the optical transceiver 100 discussed above with regards to FIG. 1) can transmit optical signals 207 to, for example, a remote optical transceiver (not shown in FIG. 2), or receive optical signals 257 from, for example, a remote optical transceiver. The operation of the optical transceiver 200 that self heals upon a detection of a failure at an optical transmitter is similar in function to the discussions with regards to FIG. 1. In one implementation, the remote optical transceiver (also referred here in to as the second optical transceiver) can detect the failed optical transmitter at the optical transceiver 200 (also referred here in to as the first optical transceiver) by, for example, detecting loss of light at the corresponding optical receiver at the remote optical transceiver. In another implementation, a fault message associated with the failed optical transmitter at the optical transceiver 200 is relayed from the optical transceiver 200 to the remote optical transceiver via an embedded communication channel (ECC) (discussed in detail in FIGS. 5, 6, and 8), or via an out-of-band (OOB) network (e.g., internet).

For example, before an optical transmitter from the set of optical transmitters 206(0)-206(n+1) fails, the Tx electrical signals are received at the first set of electrical transmitters 209(0)-209(n) and transmitted through the Tx switch 205 to the second set of electrical transmitters 215(0)-215(n). Specifically, for example, Tx electrical signals from the electrical transmitter 209(1) is transmitted to the electrical transmitter 215(1) and then to the optical transmitter 206(1). Tx electrical signals from the electrical transmitter 209(2) (not shown in FIG. 1) is transmitted to the electrical transmitter 215(2) and then to the optical transmitter 206(2). Tx electrical signals from the electrical transmitter 209(n) is transmitted to the electrical transmitter 215(n) and then to the optical transmitter 206(n). The optical signals are then multiplexed by the optical multiplexer 208 and transmitted via a common fiber (or multiple common fibers) to the remote optical transceiver.

Upon detection of a failure associated with an optical transmitter from the set of optical transmitters 206(0)-206(n+1) within the optical transceiver 200 (or the first optical transceiver), the Tx switch 205 can remap the associations between the first set of electrical transmitters 209(0)-209(n) and the second set of electrical transmitters 215(0)-215(n+1) such that the channel signals, which were transmitted via the failed channel(s), can now be transmitted via functioning channel(s) and then to a single optical fiber (or multiple optical fibers) 207. For example, if the optical transmitter 206(2) from the set of optical transmitters 206(1)-206(n+1) fails, in some instances, the Tx switch 205 can switch the Tx electrical signals from the electrical transmitter 209(2) such that the Tx electrical signals from the electrical transmitter 209(2) can be transmitted to the electrical transmitter 215(n+1) and then to the optical transmitter 206(n+1).

In one instance, the remote optical transceiver can detect the failure associated with the optical transmitter 206(2) by, for example, detecting loss of light at the corresponding optical receiver at the remote optical transceiver. The remote optical transceiver activates a spare optical receiver, which receives the optical signals associated with the spare optical transmitter 206(n+1). A receive (Rx) switch at the remote optical transceiver activates a spare electrical receiver associated with the spare optical receiver and switch the electrical signals such that the electrical signals are received via the spare electrical receiver. In another instance, a fault message associated with the failed optical transmitter (e.g., 206(2)) at the optical transceiver 200 is relayed from the optical transceiver 200 to the remote optical transceiver via an embedded communication channel (ECC) (discussed in detail in FIGS. 5, 6, and 8), or via an out-of-band (OOB) network (e.g., internet). Upon receiving the fault message, the remote optical transceiver activates a spare optical receiver and a spare electrical receiver (e.g., via the Rx switch at the remote optical transceiver) and the electrical signals are received at the spare electrical receiver.

The optical transceiver 200 can also receive optical signals 257 from, for example, a far-side receiver (not shown in FIG. 2). The optical receive (Rx) signals are received, as, for example, a multiplexed optical beam containing multiple (n) channels of received optical signals at a set of wavelengths, by the optical demultiplexer 258. These channels can be, for example, WDM channels. In some configurations, a power monitor (not shown in FIG. 2) included in the controller 210 can monitor the power of the different channels of the received optical signal. In some instances, the power monitor can measure the power in the different channels of the received optical signal at each unique wavelength from the set of wavelengths. In such instances, the power monitor can detect a failure of a received optical signal channel if, for example, the detected power in an optical channel at a specific wavelength is below a predetermined level.

In addition to monitoring the optical power of the optical signals received at each optical receiver, other indicators can be used to detect failure. For example, a data photodiode (DPD) photocurrent value below operational limits can indicate a failure. For another example, a transimpedance amplifier (TIA) current value outside of operational limits can indicate a failure.

The optical demultiplexer 258 can demultiplex the different channels of the received optical signals and send the optical signal to the set of optical receivers 256(0)-256(n+1), which are operatively coupled to the optical demultiplexer 258. Each optical receiver from the set of optical receivers 256(0)-256(n+1) can receive optical signals at a specific wavelength from a set of wavelengths. In the event that an optical receiver from the set of optical receivers 256(0)-256(n+1) fails, a receive (Rx) switch 255 can switch output/signals for the channel corresponding to the failed optical receiver and redirect to a functional channel from the set of optical receivers 256(0)-256(n+1).

For example, before a failure is detected, the Rx optical signals 257 (labeled "Optical Rx" in FIG. 2) are received at the optical demultiplexer 258 and demultiplexed to a set of optical receivers 256(0)-256(n). The n+1 channels of the optical signals are then received at a first set of electrical receivers 265(0)-265(n) and then output through the Tx switch 255 to the second set of electrical receivers 259(0)-

259(n). Optical signals from optical receiver 256(0) can be converted to electrical signals and received at the electrical receiver 265(0) from the first set of electrical receivers 265(0)-265(n). The electrical signals from the electrical receiver 265(0) can be received at the electrical receiver 259(0) from the second set of electrical receivers 259(0)-259(n). Optical signals from optical receiver 256(1) can be converted to electrical signals and received at the electrical receiver 265(1) from the first set of electrical receivers 265(0)-265(n). The electrical signals from the electrical receiver 265(1) can be received at the electrical receiver 259(1) from the second set of electrical receivers 259(0)-259(n). Optical signals from optical receiver 256(n) can be converted to electrical signals and received at the electrical receiver 265(n) from the first set of electrical receivers 265(0)-265(n). The electrical signals from the electrical receiver 265(n) can be received at the electrical receiver 259(n) from the second set of electrical receivers 259(0)-259(n). If the optical receiver (e.g., 256(2)) from the set of optical receivers 256(0)-256(n) fails, in some instances, a fault message is relayed from the optical transceiver 200 to a remote optical transceiver (not shown in FIG. 2) via an embedded communication channel (ECC) (discussed in detail in FIGS. 5, 6, and 8), or via an out-of-band (OOB) network (e.g., internet). A controller within the remote optical transceiver receives the fault message and activates a spare optical transmitter within the remote optical transceiver to match the active optical receivers of the optical transceiver 200. A Tx switch within the remote optical transceiver switches Tx electrical signals such that the optical signals are transmitted from active optical transmitters including the spare optical transmitter from the remote optical transceiver to the set of optical receivers (excluding the failed optical receiver (e.g., 256(2)) and including the spare optical receiver 256(n+1)) at the optical transceiver 200. In the meantime, the controller 210 at the optical transceiver 200 activates a spare optical receiver 256(n+1) such that the optical signals that were received at the failed optical receiver 256(2) are now received at the spare optical receiver 256(n+1). The Rx switch 255 switches electrical signals such that the electrical signals that were received at the electrical receiver 265(2) are now received at the electrical receiver 265(n+1). The electrical signals are further output through the electrical transmitters 259(0)-259(n).

In some embodiments, the mapping in the Tx switch 205 of the first optical transceiver does not match that of the Rx switch in the second optical transceiver. The switch configuration of the Tx switch 205 and Rx switch 255 at the first optical transceiver are different within the given transceiver. The Tx and Rx optical channels are different for a given transceiver. In some embodiments, the optical receivers of the first optical transceiver match the optical transmitters of the second transceiver such that the first optical transceiver and/or the second transceiver can operate at full data capacity.

Figure 3:
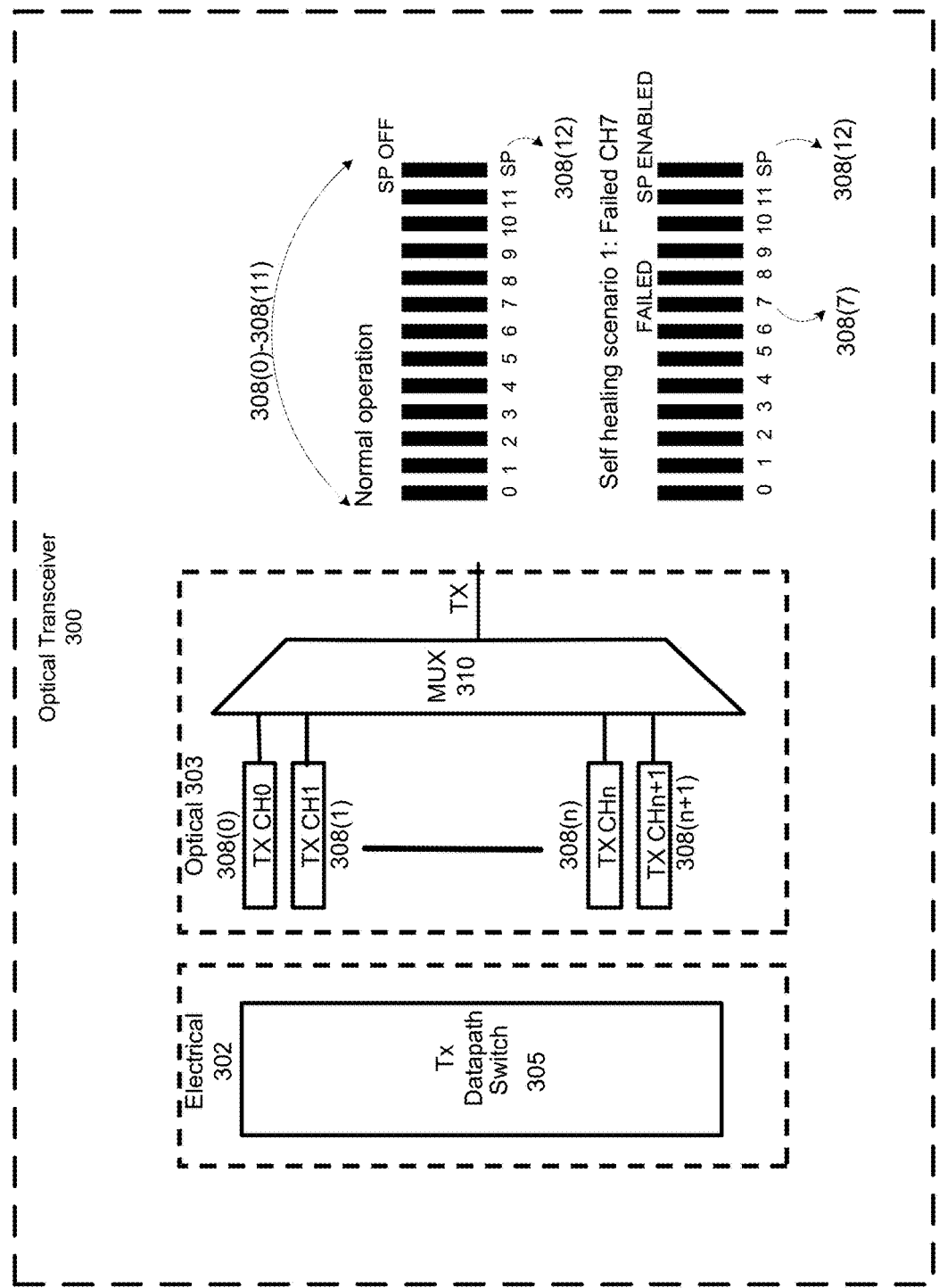
FIG. 3 is a block diagram illustrating a channel reconfiguration upon a detection of a failure within an optical transceiver, according to an embodiment.

FIG. 3 is a block diagram illustrating a channel reconfiguration upon a detection of a failure within an optical transceiver 300, according to an embodiment. The optical transceiver 300 is similar to the optical transceiver 100 described in FIGS. 1-2. The optical transceiver includes electrical functions 302 and optical functions 303. The electrical functions 302 includes a Tx datapath switch 305, which can be configured to switch electrical signals upon a detection of a failure within the optical transceiver 300. The optical functions 303 include a set of optical transmitters 308(0)-308(n+1) operatively coupled to an optical multiplexer 310. In some implementations, during normal operations, the optical functions 303 of the optical transceiver 300 include 12 optical transmitters 308(0)-308(11) that are active transmitting optical signals from the electrical functions 302. A spare optical transmitter 308(12) is inactive during normal operations. When a controller (not shown in FIG. 3 and similar to the controller 110 discussed in FIGS. 1-2) of the optical transceiver 300 detects a failure associated with the optical transmitter 308(7), the controller activates the spare optical transmitter 309(12) and sends a signal to the Tx datapath switch 305. The Tx datapath switch 305 switches the electrical signals such that optical signals will not be transmitted via the failed optical transmitter 308(7) and that optical signals will be transmitted via the spare optical transmitter 308(12).

Figure 4A:
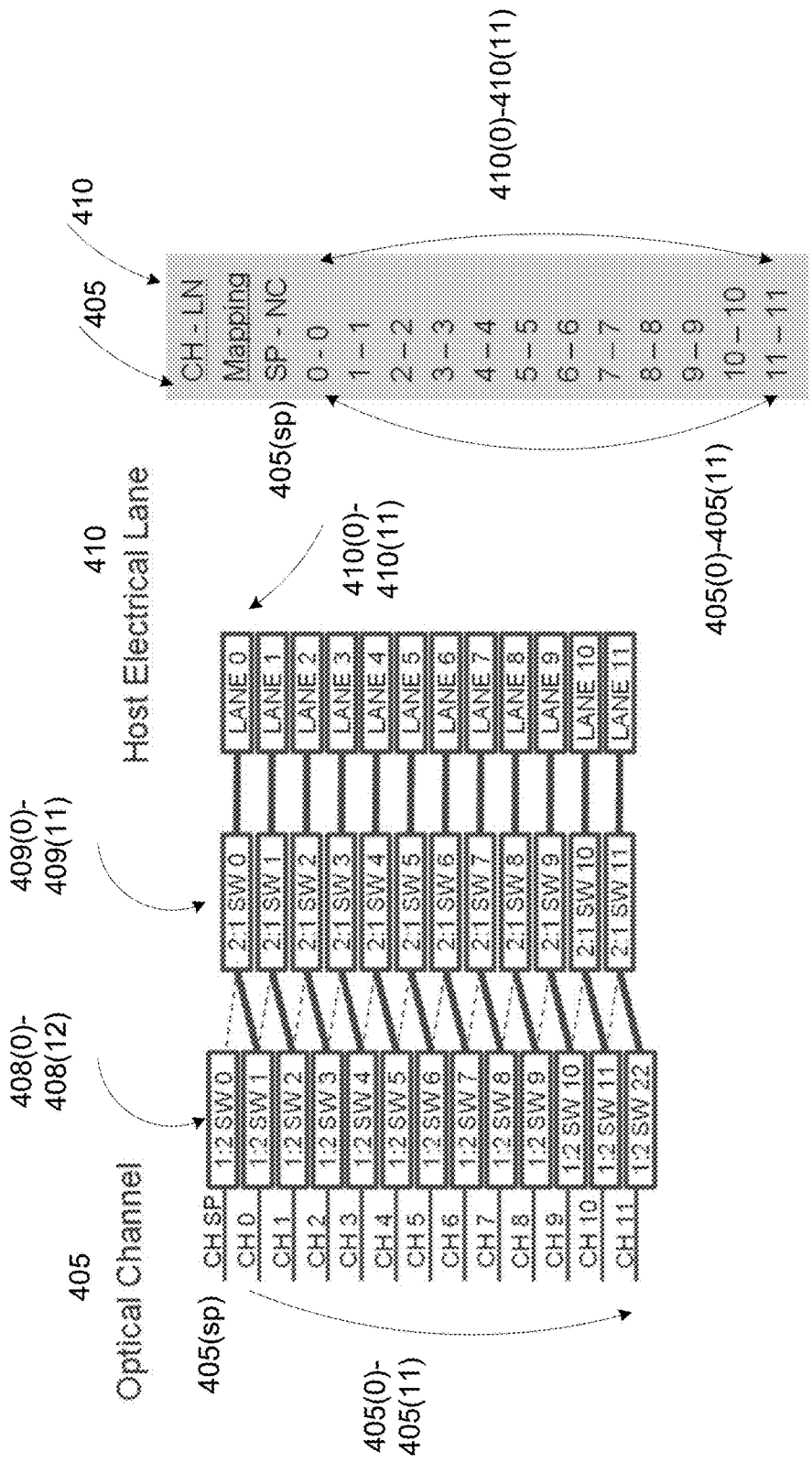
FIG. 4A is a diagram illustrating a datapath switch example during normal operation of an optical transceiver, according to an embodiment.

FIG. 4A is a diagram illustrating a datapath switch example during normal operation of an optical transceiver, according to an embodiment. In some implementations, an optical transceiver includes 12 active optical channels 405(0)-405(11) and an inactive spare optical channel 405(sp) during normal operation. The optical channels (405(sp) and 405(0)-405(11)) can be defined by optical transmitters or optical receivers. The optical transceiver includes a set of 1:2 switches 408(0)-408(12) where each switch is uniquely associated with an optical channel. The set of 1:2 switches 408(0)-408(12) is operatively coupled to a set of 2:1 switches 409(0)-409(11), which can configure the set of electrical channels 410(0)-410(11) (also referred to and labeled as "host electrical lanes". The set of electrical channels 410(0)-410(11) can be defined by electrical transmitters or electrical receivers. The mapping between the optical channels 405 and the electrical lanes 410 establishes that the spare optical channel 405(sp) is not connected, signals associated with optical channel 405(0) are transmitted/received via electrical lane 410(0), signals associated with optical channel 405(1) are transmitted/received via electrical lane 410(1), and so on. In other implementations, an optical transceiver can include any number of active optical channels and any number of spare optical channel(s).

Figure 4B:
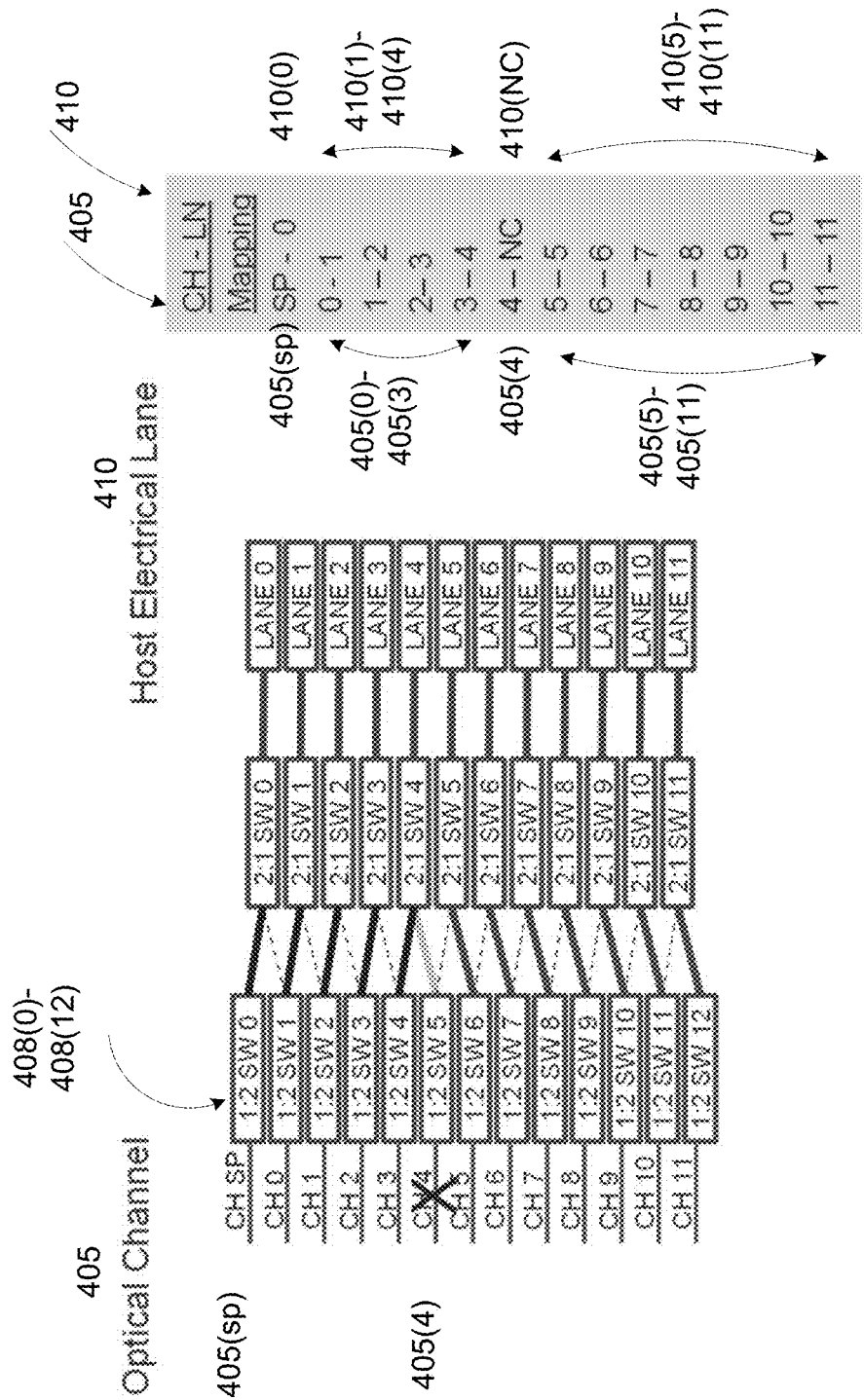
FIG. 4B is a diagram illustrating a datapath switch example during a failover operation of an optical transceiver, according to an embodiment.

FIG. 4B is a diagram illustrating a datapath switch example during a failover operation of an optical transceiver, according to an embodiment. When a controller of an optical transceiver detects a failure associated with optical channel 405(4), the controller activates the spare optical channel 405(sp). The set of 1:2 switches 408(0)-408(12) reconfigures the mapping between the optical channels 405 and the electrical lanes 410. In one implementation (not shown in FIG. 4B), the set of 1:2 switches 408(0)-408(12) switches out only the failed optical channel and activates the spare optical channel to transmit/receive signals associated with the failed optical channel. In another implementation (as shown in FIG. 4B), the set of 1:2 switches 408(0)-408(12) barrel shifts the mappings between multiple optical channels and electrical lanes. For example, upon detection of the failed channel 405(4), instead of associating the spare optical channel 405(sp) with the electrical lane 410(4) and maintaining the mappings of the other optical channels and the electrical lanes unchanged, signals associated with the spare optical channel 405(sp) are transmitted/received via electrical lane 410(0), signals associated with the optical channel 405(0) are transmitted/received via electrical lane 410(1), and so on. Optical channel 405(4) is now inactive. The datapath switch examples, illustrated in FIGS. 4A-4B represent the transmit side or the receive side of an optical transceiver.

Figure 5:
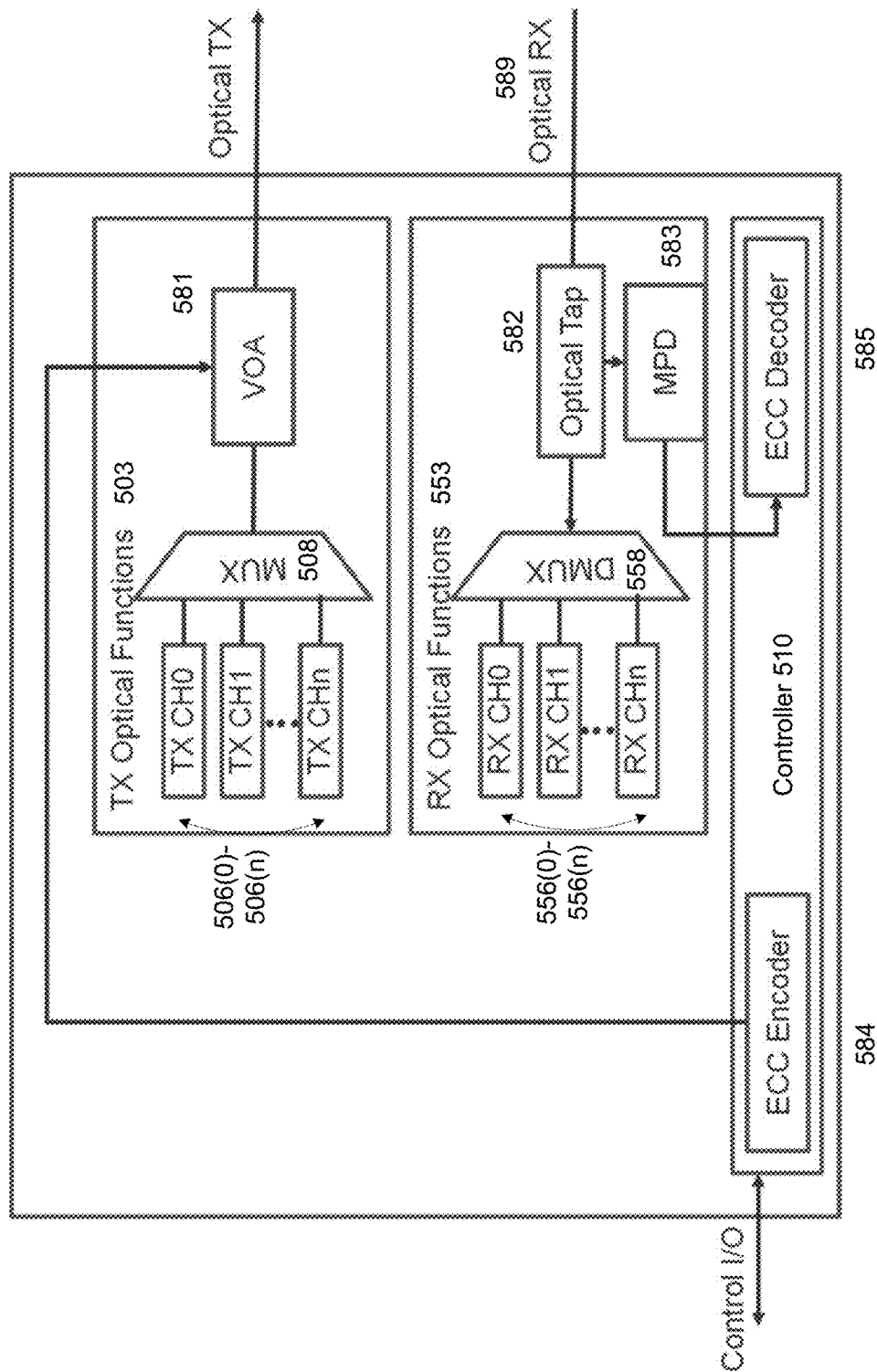
FIG. 5 is a block diagram illustrating an embedded communication channel (ECC) in an optical transceiver, according to an embodiment.

FIG. 5 is a block diagram illustrating an embedded communication channel (ECC) in an optical transceiver, according to an embodiment. In monitoring the health and the connectivity of an optical transceiver network including multiple optical transceivers, remote configuration and management of each optical transceiver without the requirement of local management is beneficial. A virtual bridge (i.e., a communication channel) between a host optical transceiver (also referred herein to as a master optical transceiver) and a remote optical transceiver (also referred herein to as a slave optical transceiver) can be configured to facilitate such remote management and configuration. A communication channel can be out of band (e.g., over the internet), in band (e.g., using reserved bits in data framing of at least one of the optical channels), or via an embedded communication channel (ECC). FIG. 5 and its related description discuss an example of a communication channel via the ECC.

As shown in FIG. 5, the transmit (Tx) optical functions 503 of the optical transceiver 500 includes a set of optical transmitters 506(0)-506(n), an optical multiplexer 508, and a variable optical attenuator (VOA) 581. The variable optical attenuator 581 can include, for example, a Mach-Zehnder Modulator (MZM), a micro-electromechanical system (MEMS), or other technology that varies an optical signal amplitude as a function of an applied electrical signal. The optical transceiver includes a controller 510, which includes an ECC encoder 584 and an ECC decoder 585. During transmission of optical signals, the ECC encoder 584 applies a low frequency (e.g., 100 kHz) electrical signal to the VOA 581 to modulate the amplitude of the optical signals. The applied low frequency electrical signal carries control information such as an instruction or information about activating or deactivating an optical channel (e.g., a spare optical channel). Such control information can be contained in the magnitude, phase, or both of the low frequency electrical signal. The frequency of the electrical signal carrying the control information is lower than the frequencies of the optical signals such that the transmission of the optical signals are not affected by the low frequency electrical signal. The low frequency electrical signal can be applied to one or multiple optical signals.

During receiving of the optical signals, the optical Rx signals 589 are tapped by an optical tap 582 and a portion of the optical Rx signals are detected in an optical detector 583. The optical detector 583 can include, for example, a monitor photodiode (MPD). The signal from the MPD is further filtered in a low pass filter (LPF) and amplified (not shown in FIG. 5) and sent to an ECC decoder 585. The ECC decoder 585 extracts the embedded control information and the controller 510 analyzes the control information to control the optical transceiver such as activating or deactivating an optical channel (e.g., a spare optical channel). The control information analysis can be implemented by a processor and/or a memory of the controller 510.

Figure 6:
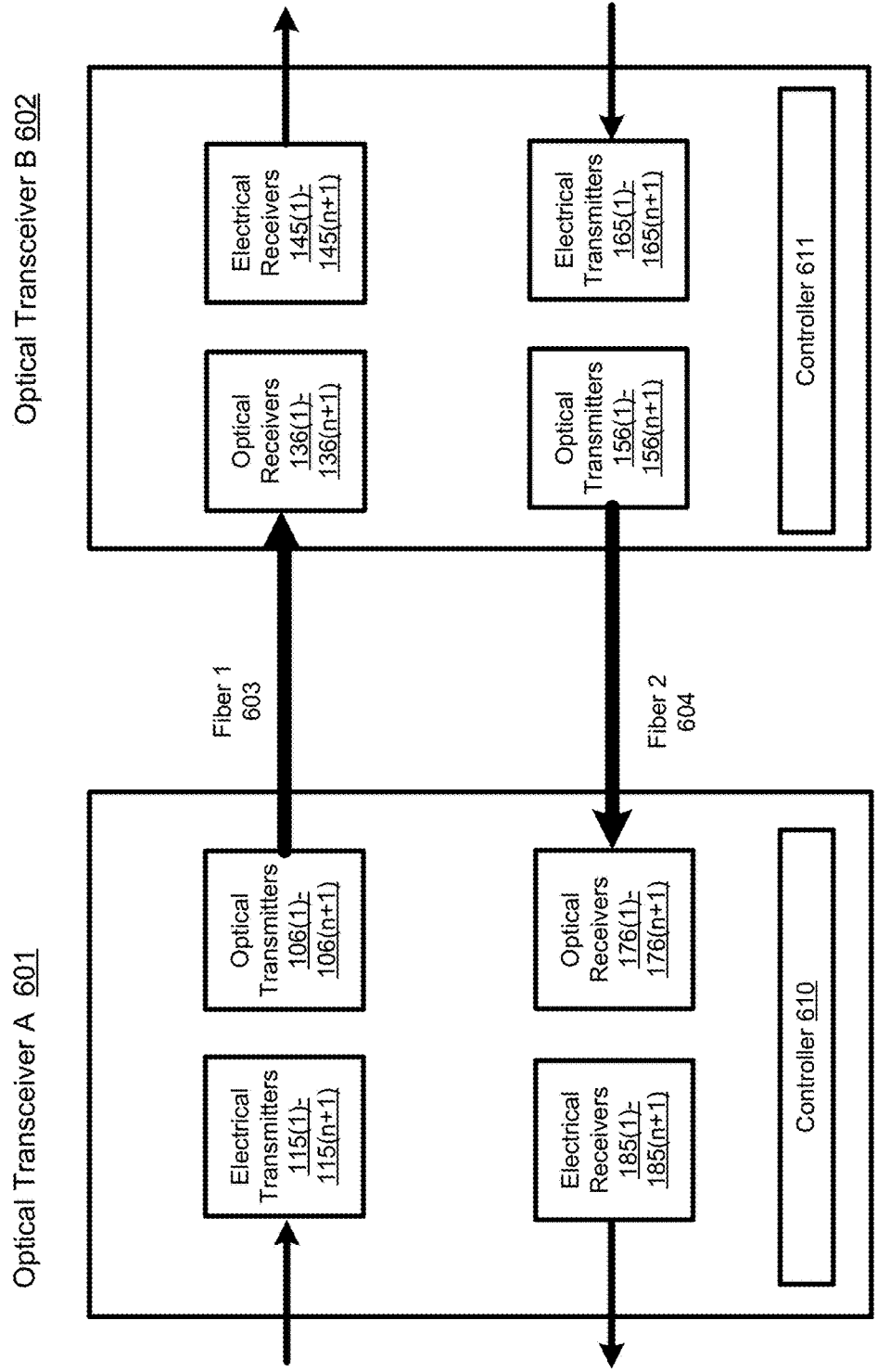
FIG. 6 is a block diagram illustrating a master optical transceiver and a slave optical transceiver, according to an embodiment.

FIG. 6 is a block diagram illustrating a master optical transceiver and a slave optical transceiver, according to an embodiment. An optical transceiver A 601 (e.g., a master optical transceiver, or a first optical transceiver) can transmit via a fiber 603 optical signals to, and/or receive via a fiber 604 optical signals from, a remote optical transceiver B 602 (e.g., a slave optical transceiver, or a second optical transceiver). Control information encoded by an ECC encoder (as described in FIG. 5) via a low frequency electrical signal can be embedded with such optical signals transmitted/received such that the activation and deactivation of optical channels from a slave optical transceiver 602 can be controlled by a master optical transceiver 601.

For example, a controller 610 of optical transceiver A 601 detects a failure associated with an optical transmitter of the optical transceiver A 601. The optical transceiver A 601 activates a spare optical transmitter and a Tx switch at the optical transceiver A 601 switches electrical signals such that electrical signals are transmitted through functional electrical transmitters to functional optical transmitters including the spare optical transmitter. In the meantime, a fault message is encoded by the ECC encoder of the controller 610 of the optical transceiver A 601 via a low frequency electrical signal and embedded into the optical signals transmitted to the optical transceiver B 602 via the fiber 603. The fault message is received by the optical receivers of the optical transceiver B 602. An ECC decoder in the controller 611 of the optical transceiver B 602 decodes such fault message and activates prescribed failover of optical receivers of the optical transceiver B 602 in response to the fault message such that optical signals are received at functional optical receivers of the optical transceiver B 602. An Rx switch at the optical transceiver B 602 switches electrical signals such that electrical signals are output via functional electrical receivers at the optical transceiver B 602.

When the controller 610 of optical transceiver A 601 detects a failure associated with an optical receiver of the optical transceiver A 601. The fault message is encoded by the ECC encoder of the controller 610 of the optical transceiver A 601 via a low frequency electrical signal and embedded into optical signals transmitted to the optical transceiver B 602 via the fiber 603. The fault message is received at the optical transceiver B 602. An ECC decoder in the controller 611 of the optical transceiver B 602 decodes such fault message and activates prescribed failover of optical transmitters of the optical transceiver B 602 such that optical signals are transmitted through optical transmitters at the optical transceiver B 602 and are received at functional optical receivers at the optical transceiver A 601. An Rx switch at optical transceiver A 601 can switch the electrical signals such that all received optical signals are connected to electrical receivers at the output of the optical transceiver A 601. Likewise, a Tx switch at optical transceiver B 602 can switch the electrical signals such that all optical transmit signals are connected to electrical transmitters at the input to the optical transceiver B 602.

The failure associated with the optical transmitters at the master optical transceiver can be detected by monitoring the optical power of the optical signals output from each optical transmitter. Other indicators can be used to detect failures. For example, a laser gain current approaching an end-of-life (EOL) value can indicate a failure. For another example, a modulator bias outside of operational limits can indicate a failure.

Figure 7:
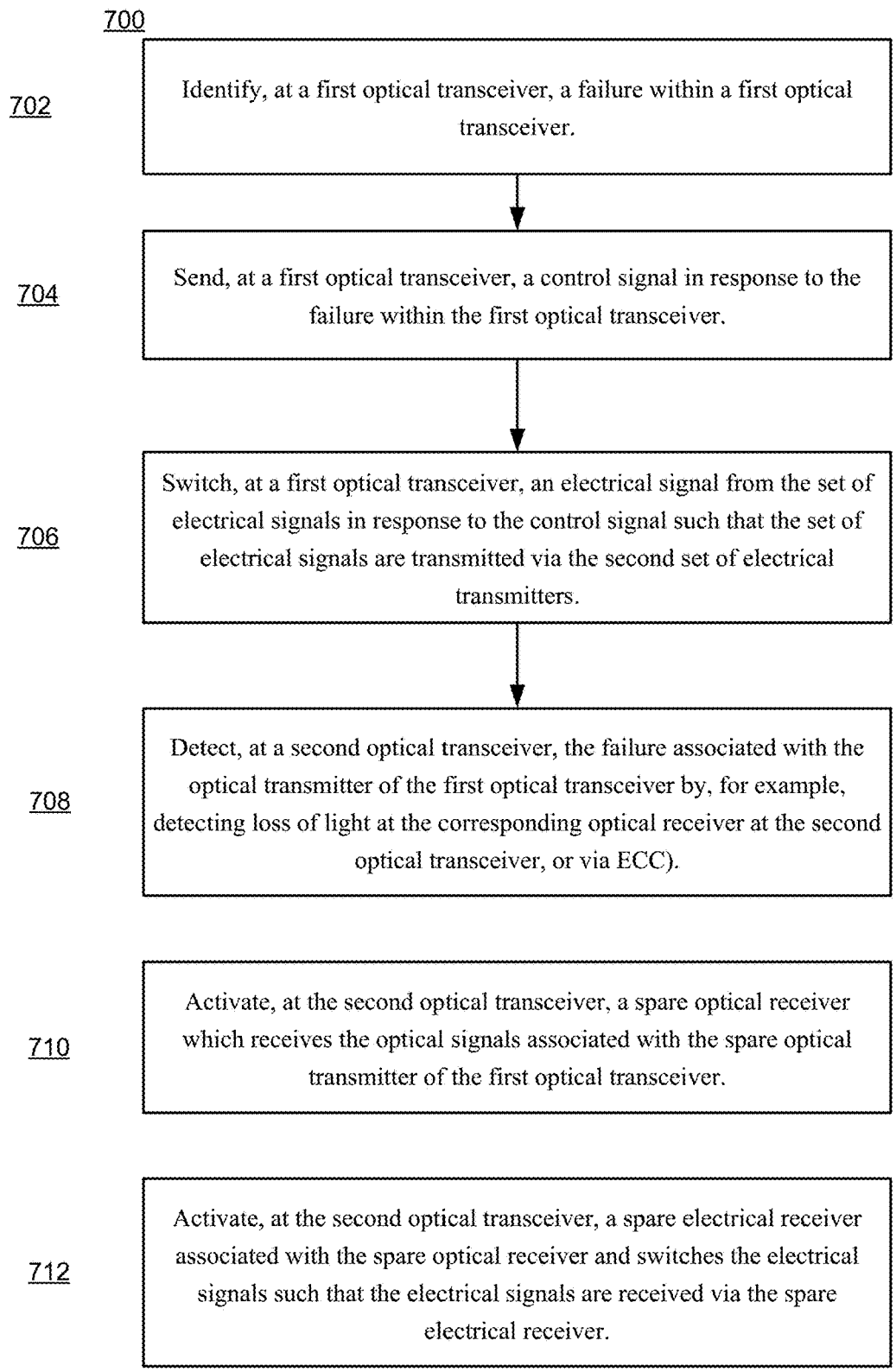
FIG. 7 is a flow chart illustrating a method of self healing optical transceivers upon a detection of a failure at a transmitter of an optical transceiver, according to an embodiment.

FIG. 7 is a flow chart illustrating a method of self-healing optical transceivers upon a detection of a failure at a transmitter of an optical transceiver, according to an embodiment. This method can be implemented at a processor and/or a memory (e.g., processor 120 or memory 122 as discussed in FIG. 1) of a controller of an optical transceiver. The method includes identifying a failure within a first optical transceiver at 702. As discussed above, a controller of the first optical transceiver (such as controller 110 as discussed in FIG. 1) identifies a failure associated with at least one of an optical transmitter from a set of optical transmitters within the first optical transceiver. Each optical transmitter from the set of optical transmitters transmits optical signals at a unique wavelength from a set of wavelengths. The optical signals output from the set of optical transmitters are multiplexed by an optical multiplexer and transmitted by a single optical fiber (or multiple optical fibers). In some configurations, a power monitor included in the controller can monitor the power in the optical signals in the different channels. In such configurations, the power monitor can monitor the power of the optical signals at each unique wavelength from the set of wavelengths associated with the different channels. In such instances, the power monitor can detect a failure of an individual optical transmitter from the set of optical transmitters if, for example, the power in optical signals transmitted by the individual optical transmitter at a unique wavelength is below a pre-determined level.

The method further includes sending a control signal, at the first optical transceiver, in response to the detection of the failure associated with the at least one of the optical transmitter at 704. The control signal can be sent to activate a spare optical transmitter (or multiple spare optical transmitters) such that the optical signals associated with the failed optical transmitter(s) can now be transmitted via the spare optical transmitter(s), and that the operation of the optical transceiver is maintained.

The control signal is also sent to a transmit (Tx) switch included in electrical functions of the first optical transceiver. The Tx switch is operatively coupled to a first set of electrical transmitters and a second set of electrical transmitters. The first set of electrical transmitters receives a set of electrical signals. The Tx switch switches an electrical signal from the set of electrical signals in response to the control signal at 706 such that the set of electrical signals are transmitted via the second set of electrical transmitters. Each electrical transmitter from the second set of electrical transmitters is operatively coupled to an optical transmitter from the set of optical transmitters. The second electrical transmitter includes a spare electrical transmitter (or multiple electrical transmitters) associated with the spare optical transmitter(s). The steps 702-706 of the method 700 illustrate the self healing of the first optical transceiver upon detection of a failure associated with an optical transmitter at the first optical transceiver.

Optionally, the first optical transceiver can communicate to a second optical transceiver by transmitting optical signals to the second optical transceiver via for example, an optical fiber. The second optical transceiver can self heal upon detection of the failure associated with the optical transmitter at the first optical transceiver. For instance at 708, the second optical transceiver detects the failure associated with the optical transmitter of the first optical transceiver by, for example, detecting loss of light at the corresponding optical receiver at the second optical transceiver. At 710, a controller (such as controller 611 as discussed in FIG. 6) of the second optical transceiver activates a spare optical receiver, which receives the optical signals associated with the spare optical transmitter of the first optical transceiver. At 712, a receive (Rx) switch at the second optical transceiver activates a spare electrical receiver associated with the spare optical receiver and switches the electrical signals such that the electrical signals are received via the spare electrical receiver. In another instance, a fault message associated with the failed optical transmitter at the first optical transceiver is relayed from the first optical transceiver to the second optical transceiver via an embedded communication channel (ECC) (discussed in detail in FIGS. 5, 6, and 8), or via an out-of-band (OOB) network (e.g., internet). Upon receiving the fault message, the second optical transceiver activates a spare optical receiver and a spare electrical receiver (e.g., via the Rx switch at the second optical transceiver) and the electrical signals are received at the spare electrical receiver.

The self healing method of the first optical transceiver upon the detection of a failure associated with an optical transmitter at the first optical transceiver (e.g., steps 702-706 of the method 700) can be implemented independently of the self healing method of the second optical transceiver upon the detection of the failure associated with the optical transmitter at the first optical transceiver (e.g., steps 708-712 of the method 700). Similarly stated, the self healing method of the first optical transceiver upon the detection of a failure associated with an optical transmitter at the first optical transceiver (e.g., steps 702-706 of the method 700) can be performed alone without the implementation of the self healing method of the second optical transceiver upon the detection of the failure associated with the optical transmitter at the first optical transceiver (e.g., steps 708-712 of the method 700).

FIG. 8 is a flow chart illustrating a method of self healing an optical transceiver upon a detection of a failure at a receiver of the optical transceiver, according to an embodiment. This method can be implemented at one of a processor or a memory (e.g., processor 120 or memory 122 as discussed in FIG. 1) of a controller of a first optical transceiver (also referred herein to as a master optical transceiver) and a second optical transceiver (also referred herein to as a slave optical transceiver). The first optical transceiver detects a failure associated with an optical receiver from a set of optical receivers within the first optical transceiver at 802 and activates a spare optical receiver. The failure can also be associated with an optical transmitter within the second optical transceiver or an optical connection (e.g., an optical fiber, an optical filter) between the first optical transceiver and the second optical transceiver. Each optical receiver from the set of optical receivers receives optical signals at a unique wavelength from a set of wavelengths. Optical signals that are received by the set of optical receivers are first received and demultiplexed by an optical demultiplexer via a single optical fiber (or multiple optical fibers). A receive (Rx) switch at the first optical transceiver switches electrical signals such that the electrical signals are received at electrical receivers associated with functional optical receivers (excluding the failed optical receiver and including the spare optical receiver) at the first optical transceiver.

The controller (e.g., an encoder within the controller) of the first optical transceiver embeds a control signal associated with the failure on the output optical signals transmitted to the second optical transceiver at 804. The controller of the first optical transceiver applies a low frequency (e.g., 100 kHz) electrical signal to a variable optical attenuator (VOA) (such as the variable optical attenuator 581 discussed in FIG. 5) of the first optical transceiver to modulate the amplitude of the optical signals. The VOA is operatively coupled to an optical multiplexer, which multiplexes multiple channels of optical signals onto a single optical fiber (or multiple optical fibers). The applied low frequency electrical signal carries control information such as instructions or information for activating or deactivating an optical channel (e.g., a spare optical channel).

The second optical transceiver receives such optical signals with such a control signal embedded at 806. The optical Rx signals are tapped by an optical tap and a portion of the optical Rx signals are detected in an optical detector (such as the optical tap 582 and the optical detector 583 in FIG. 5. Upon measuring the optical Rx signals with such control signal embedded, an ECC decoder extracts the control information embedded due to the modulation of the low frequency electrical signal and analyzes the control information to control the second optical transceiver such as activating or deactivating an optical channel (e.g., a spare optical channel). In such implementation, the controller of the second optical transceiver activates a spare optical transmitter to match active optical receivers of the first optical transceiver at 808. The first optical transceiver receives the expected signals from the second optical transceiver at 810.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
   transmitting, from each electrical transmitter from a first plurality of electrical transmitters, an electrical signal from a plurality of electrical signals, the plurality of electrical transmitters being included in a first optical transceiver and operatively coupled to a switch, the first optical transceiver including a controller and a variable optical attenuator (VOA), the controller being operatively coupled to the switch and the VOA;
   switching an electrical signal from the plurality of electrical signals to a spare electrical transmitter within a second plurality of electrical transmitters such that the plurality of electrical signals are transmitted via the second plurality of electrical transmitters, each electrical transmitter from the second plurality of electrical transmitters operatively coupled to an optical transmitter from a plurality of optical transmitters, the plurality of optical transmitters being operatively coupled to an optical multiplexer, at least one electrical transmitter from the second plurality of electrical transmitters associated with a failure within the first optical transceiver; and
   sending, from the controller, a control signal to the VOA such that the VOA modulates with a signal representing control information for a second optical transceiver to be operatively coupled to the first optical transceiver, the control information associated with the failure within the first optical transceiver.

2. The method of claim 1, wherein:
   the control signal is a first control signal;
   the switching including switching the electrical signal from the plurality of electrical signals in response to a second control signal from the controller of the first optical transceiver.

3. The method of claim 1, wherein:
   the failure is associated with a failed optical transmitter within the first optical transceiver.

4. The method of claim 1, wherein:
   the switching including switching a set of electrical signals including the electrical signal from the plurality of electrical signals such that the set of electrical signals are transmitted through a set of electrical transmitters from the second plurality of electrical transmitters,
   the set of electrical transmitters including (1) the spare electrical transmitter from the second plurality of electrical transmitters and (2) electrical transmitters between the spare electrical transmitter and the at least one electrical transmitter from the second plurality of electrical transmitters associated with the failure within the first optical transceiver.

5. The method of claim 1, further comprising:
   transmitting, for each optical transmitter from the plurality of optical transmitters, at a unique wavelength from a plurality of wavelengths, each electrical signal from the plurality of electrical signals uniquely corresponding to an optical transmitter from the plurality of optical transmitters, the plurality of optical transmitters coupled onto a common fiber.

6. The method of claim 1, wherein:
   the failure is associated with at least one of an optical transmitter from the plurality of optical transmitters or the optical multiplexer.

7. A method, comprising:
   automatically identifying, at a first optical transceiver, a failure within the first optical transceiver, the first optical transceiver having an electrical portion and an optical portion operatively coupled to the electrical portion of the first optical transceiver, the electrical portion including a switch, the first optical transceiver including a controller and a variable optical attenuator (VOA), the controller being operatively coupled to the switch and the VOA;
   sending, from the controller, a first control signal to the switch in response to the failure from at least one of a transmitter or a receiver of the first optical transceiver;

receiving, at the switch, a plurality of electrical signals associated with a first plurality of electrical transmitters, each electrical signal from the plurality of electrical signals uniquely associated with an electrical transmitter from the first plurality of electrical transmitters;

switching, at the switch, an electrical signal from the plurality of electrical signals to a spare electrical transmitter within a second plurality of electrical transmitters such that the plurality of electrical signals are transmitted via the second plurality of electrical transmitters in response to the first control signal; and sending, from the controller, a second control signal to the VOA such that the VOA modulates with a signal representing control information for a second optical transceiver to be operatively coupled to the first optical transceiver, the control information associated with the failure within the first optical transceiver.

8. The method of claim 7, wherein:
the optical portion of the first optical transceiver includes a plurality of optical transmitters and an optical multiplexer, the failure being associated with at least one of an optical transmitter from the plurality of optical transmitters or the optical multiplexer, the second plurality of electrical transmitters including the spare electrical transmitter.

9. The method of claim 7, wherein the first optical transceiver includes an optical tap, an optical detector operatively coupled to the optical tap, the controller operatively coupled to the optical detector, the method further comprising:
receiving, at the optical tap, a portion of an optical signal received from the second optical transceiver;
detecting, at the optical detector, the optical signal to produce a detected signal; and
decoding, at the controller, the detected signal to extract an encoded signal from the electrical signal and associated with the failure.

10. The method of claim 7, further comprising:
switching a set of electrical signals including the electrical signal from the plurality of electrical signals such that the set of electrical signals are transmitted through a set of electrical transmitters from the second plurality of electrical transmitters,
the set of electrical transmitters including (1) the spare electrical transmitter from the second plurality of electrical transmitters and (2) electrical transmitters between the spare electrical transmitter and at least one electrical transmitter from the second plurality of electrical transmitters associated with the failure.

11. A method, comprising:
sending, from a controller, a first control signal to a switch in response to a failure being detected in at least one of or between a first optical transceiver and a second optical transceiver to be operatively coupled to the first optical transceiver, the first optical transceiver having an electrical portion and an optical portion operatively coupled to the electrical portion of the first optical transceiver, the electrical portion including the switch, the first optical transceiver including the controller and a variable optical attenuator (VOA), the controller being operatively coupled to the switch and the VOA;
receiving, at the switch, a plurality of electrical signals associated with a first plurality of electrical transmitters, each electrical signal from the plurality of electrical signals uniquely associated with an electrical transmitter from the first plurality of electrical transmitters;

switching, at the switch, an electrical signal from the plurality of electrical signals to a spare electrical transmitter within a second plurality of electrical transmitters such that the plurality of electrical signals are transmitted via the second plurality of electrical transmitters in response to the first control signal; and sending, from the controller, a second control signal to the VOA such that the VOA modulates with a signal representing control information for the second optical transceiver, the control information associated with the failure in the at least one of or between the first optical transceiver and the second optical transceiver.

12. The method of claim 11, wherein the failure is within the first optical transceiver, the method further comprising:
automatically identifying, at the controller, the failure within the first optical transceiver; and
sending, from the controller, the first control signal to the switch in response to the failure.

13. The method of claim 11, wherein the failure is within the second optical transceiver, the method further comprising:
receiving, at the controller and from the second optical transceiver, information associated with the failure; and
sending, from the controller, the first control signal to the switch based on the information.

14. The method of claim 11, wherein the first optical transceiver includes an optical tap, an optical detector operatively coupled to the optical tap, and the controller operatively coupled to the optical detector, the method further comprising:
receiving, at the optical tap, a portion of an optical signal received from the second optical transceiver;
detecting, at the optical detector, the optical signal to produce a detected signal; and
decoding, at the controller, the detected signal to extract an encoded signal from the electrical signal and associated with the failure.

15. The method of claim 11, wherein the failure is within the first optical transceiver, the method further comprising:
switching, at the switch, a set of electrical signals including the electrical signal from the plurality of electrical signals such that the set of electrical signals are transmitted through a set of electrical transmitters from the second plurality of electrical transmitters,
the set of electrical transmitters including (1) the spare electrical transmitter from the second plurality of electrical transmitters and (2) electrical transmitters between the spare electrical transmitter and the at least one electrical transmitter from the second plurality of electrical transmitters associated with the failure within the first optical transceiver.

16. A method, comprising:
transmitting, from each electrical transmitter from a first plurality of electrical transmitters, an electrical signal from a plurality of electrical signals, a first optical transceiver having the first plurality of electrical transmitters operatively coupled to a switch; and switching, at the switch, an electrical signal from the plurality of electrical signals to a spare electrical transmitter within a second plurality of electrical transmitters such that the plurality of electrical signals are output via the second plurality of electrical transmitters, each electrical transmitter from the first plurality of electrical transmitters operatively coupled to an optical transmitter from a plurality of optical transmitters, the plurality of optical transmitters being operatively coupled to an optical multiplexer, at least one electrical transmitter from the first plurality of electrical transmitters associated with a failure within the first optical transceiver;

receiving, at an optical tap of the first optical transceiver, a portion of an optical signal from a second optical transceiver;

detecting, at an optical detector coupled to the optical tap, the optical signal to produce a detected signal; and decoding the detected signal to extract an encoded signal from the electrical signal and associated with the failure.

17. The method of claim 16, wherein the decoding is performed at a controller coupled to the optical detector.

18. The method of claim 16, wherein:

the switching including switching a set of electrical signals including the electrical signal from the plurality of electrical signals such that the set of electrical signals are transmitted through a set of electrical transmitters from the second plurality of electrical transmitters, the set of electrical transmitters including (1) the spare electrical transmitter from the second plurality of electrical transmitters and (2) electrical transmitters between the spare electrical transmitter and the at least one electrical transmitter from the second plurality of electrical transmitters associated with the failure within the first optical transceiver.

19. The method of claim 16, further comprising:

automatically identifying, at a controller, the failure within the first optical transceiver;

sending, from the controller, a control signal to the switch in response to the failure; and switching, at the switch, the electrical signal to the spare electrical transmitter in response to the control signal.

20. The method of claim 16, wherein:

the first optical transceiver includes an optical multiplexer, the failure being associated with at least one of an optical transmitter from the plurality of optical transmitters or the optical multiplexer.

* * * * *